United States Patent [19]

Wagstaff et al.

[11] Patent Number: 4,896,477
[45] Date of Patent: Jan. 30, 1990

[54] NET WRAPPING APPARATUS

[75] Inventors: Robert A. Wagstaff, Lancaster; John H. Merritt, New Holland, both of Pa.

[73] Assignee: Ford New Holland, Inc., New Holland, Pa.

[21] Appl. No.: 322,261

[22] Filed: Mar. 13, 1989

[51] Int. Cl.[4] .................. B65B 11/56; B65B 21/12; B65B 41/6
[52] U.S. Cl. ................................ 53/118; 53/389; 53/587
[58] Field of Search .............. 53/118, 211, 389, 399, 53/587; 100/15, 88

[56] References Cited

U.S. PATENT DOCUMENTS

| | | | |
|---|---|---|---|
| 4,366,665 | 1/1983 | Van Ginhoven et al. | 100/88 X |
| 4,407,113 | 10/1983 | Core | 53/211 X |
| 4,563,854 | 1/1986 | Ackermann et al. | 53/587 X |
| 4,604,855 | 8/1986 | Krone et al. | 53/389 X |
| 4,610,123 | 9/1986 | Krone et al. | 53/118 |
| 4,677,807 | 7/1987 | Verhulst et al. | 53/587 X |
| 4,729,213 | 3/1988 | Raes | 53/587 X |
| 4,768,431 | 9/1988 | Merritt et al. | 100/88 |
| 4,779,526 | 10/1988 | Frerich et al. | 53/118 X |
| 4,787,193 | 11/1988 | Verhulst et al. | 53/389 X |
| 4,790,125 | 12/1988 | Merritt | 53/587 |

FOREIGN PATENT DOCUMENTS 3418681 11/1985 Fed. Rep. of Germany ........ 53/118

Primary Examiner—John Sipos
Assistant Examiner—Beth Bianca
Attorney, Agent, or Firm—Darrell F. Marquette; Frank A. Seemar; Larry W. Miller

[57] ABSTRACT

Apparatus for wrapping cylindrical bales of crop material with netting material includes a feed roller which may be selectively driven to dispense the netting material from a supply roll into a round baler. The apparatus has a home position and a cutting position wherein the feed roller is latched by a latch arm. The apparatus also has a feeding position wherein the feed roller is driven by the PTO of a tractor. A lever mounted for rotation about the axis of the feed roller has an idler pulley on one end thereof engageable with a belt for effecting the driving of the feed roller. The lever also has a rod on the other end thereof connected to a latch arm for effecting the latching of the feed roller. An electrical actuator is connected to the lever for moving the apparatus between the home, feeding, and cutting positions. A knife for cutting the netting material is connected to the lever for movement between a retracted position and an operative position.

11 Claims, 5 Drawing Sheets

4,896,477

NET WRAPPING APPARATUS

BACKGROUND OF THE INVENTION

This invention relates generally to round balers for making cylindrical bales of crop material and, in particular, to an improved net wrapping apparatus for such balers.

U.S. Pat. No. 4,768,431 granted Sept. 6, 1988 to John H. Merritt III et al discloses a net dispenser drive for round balers wherein a net feed roll is latched as a knife is moved into an operative position to cut the netting material. This latching of the feed roll exerts extra force on the netting material causing it to be cut by the knife. After the netting material is cut, the knife is moved into a retracted position which simultaneously causes unlatching of the feed roll. With the feed roll unlatched, netting material is sometimes fed into the baler at improper times. Furthermore, when the feed roll is unlatched, netting material could hang on incoming crop material during bale formation and be inadvertently fed into the baler.

SUMMARY OF THE INVENTION

It is an object of the present invention to provide an improved net wrapping apparatus for round balers which overcomes the above-mentioned problems.

It is a further object of the present invention to provide net wrapping apparatus for round balers wherein the timing of the latching and unlatching of a net feed roller is improved thereby resulting in more reliable cutting of netting material and reduced wear on the mechanism that latches and unlatches the feed roller.

The present invention accomplishes these objects by providing net wrapping apparatus including a feed roller which may be selectively driven to dispense netting material from a supply roll. The apparatus has a home position and a cutting position wherein the feed roller is latched. The apparatus also has a feeding position wherein the feed roller is driven. The apparatus comprises a lever mounted for rotation about the axis of the feed roller. The lever has first means on one end thereof for effecting the driving of the feed roller and has second means on the other end thereof for effecting the latching of the feed roller.

In the preferred embodiment of the apparatus, the first means comprises an idler pulley engageable with a belt to thereby tighten the belt so that the belt delivers driving power to a pulley connected to the feed roller. The second means comprises a rod for rotating a latch arm to latch and unlatch the feed roller. An actuator is connected to the lever for moving the apparatus between the home, feeding and cutting positions. A knife is connected to the lever for movement between a retracted position and an operative position. During operation, the latch arm is rotated to unlatch the feed roller only when the apparatus is moved from the home position to the feeding position. The latch arm is rotated to latch the feed roller when the apparatus is moved from the feeding position to the cutting position. The feed roller remains latched by the latch arm when the apparatus moves from the cutting position to the home position. The knife is disposed in its retracted position when the apparatus is in the home and feeding positions but the knife is moved from its retracted position to its operative position when the apparatus is moved from the feeding position to the cutting position.

DESCRIPTION OF THE PREFERRED EMBODIMENT

Figure 1:
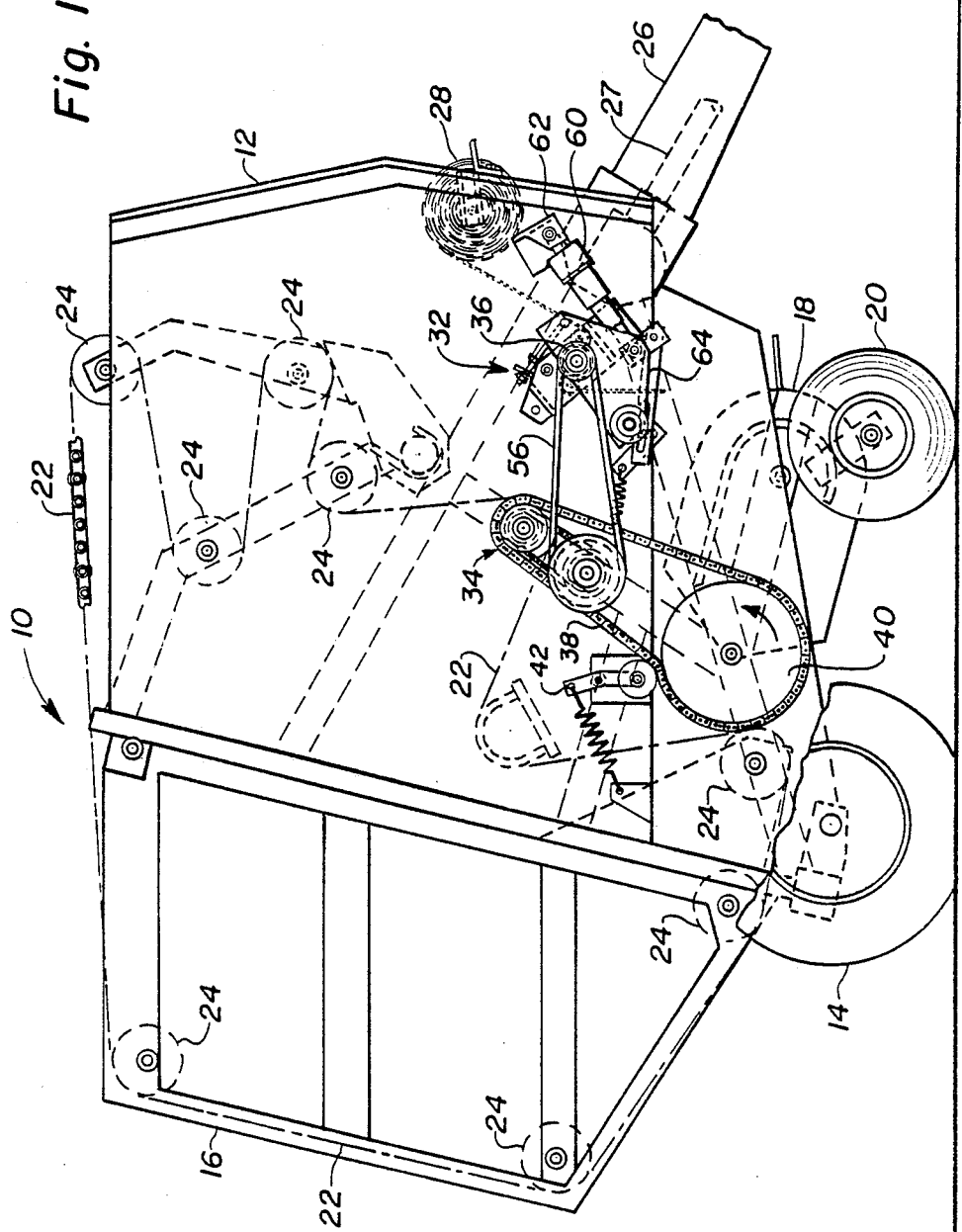
FIG. 1 is a side elevation view of a round baler incorporating an improved net wrapping apparatus according to the present invention.

Referring to FIG. 1, a round baler 10 generally of the type disclosed in U.S. Pat. No. 4,426,833 includes a main frame 12 supported by a pair of wheels 14, a tailgate 16 pivotally connected to the main frame 12, a pickup 18 pivotally mounted on main frame 12 and supported by a pair of wheels 20. A bale forming apron 22 extends around guide rollers 24 that are rotatably mounted in the main frame 12 and in the tailgate 16. Round baler 10 also includes a tongue 26 for attachment to a tractor (not shown) so that the round baler 10 may be towed across a field to pick up crop material and form it into cylindrical bales.

A supply roll 28 of netting material N is mounted on a spindle 30 rotatably journalled in the main frame 12 in a manner such as disclosed in U.S. Pat. No. 4,768,431 granted Sept. 6, 1988 and incorporated herein by reference. Net wrapping apparatus 32 is provided to feed netting material N from the roll 28 so that it may be wrapped circumferentially around bales formed in the round baler 10. Apparatus 32 also serves to cut the netting material once the formed bales have been sufficiently wrapped with approximately 1-2 full revolutions of netting material. Drive means 34 is connected to a feed roller 36 which is part of the apparatus 32 to provide power to the feed roller 36. Power for drive means 34 is supplied by a chain 38 which extends around a sprocket 40 that is driven from a shaft 27 coupled to the PTO of a tractor. Chain 38 is tensioned by a spring loaded idler 42.

Figure 2:
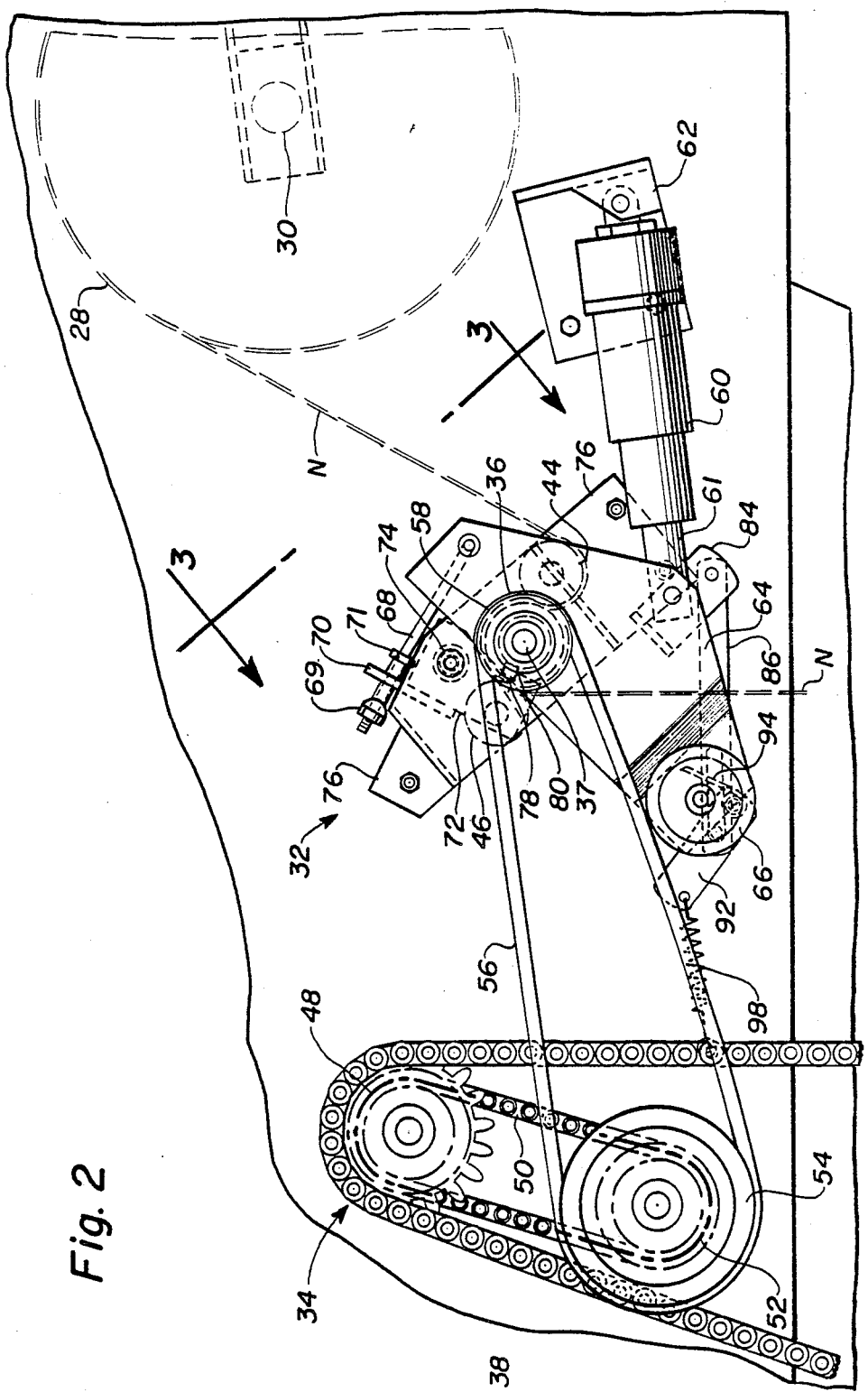
FIG. 2 is an enlarged side elevation view of the net wrapping apparatus of FIG. 1 in a home or bale forming position.
Figure 3:
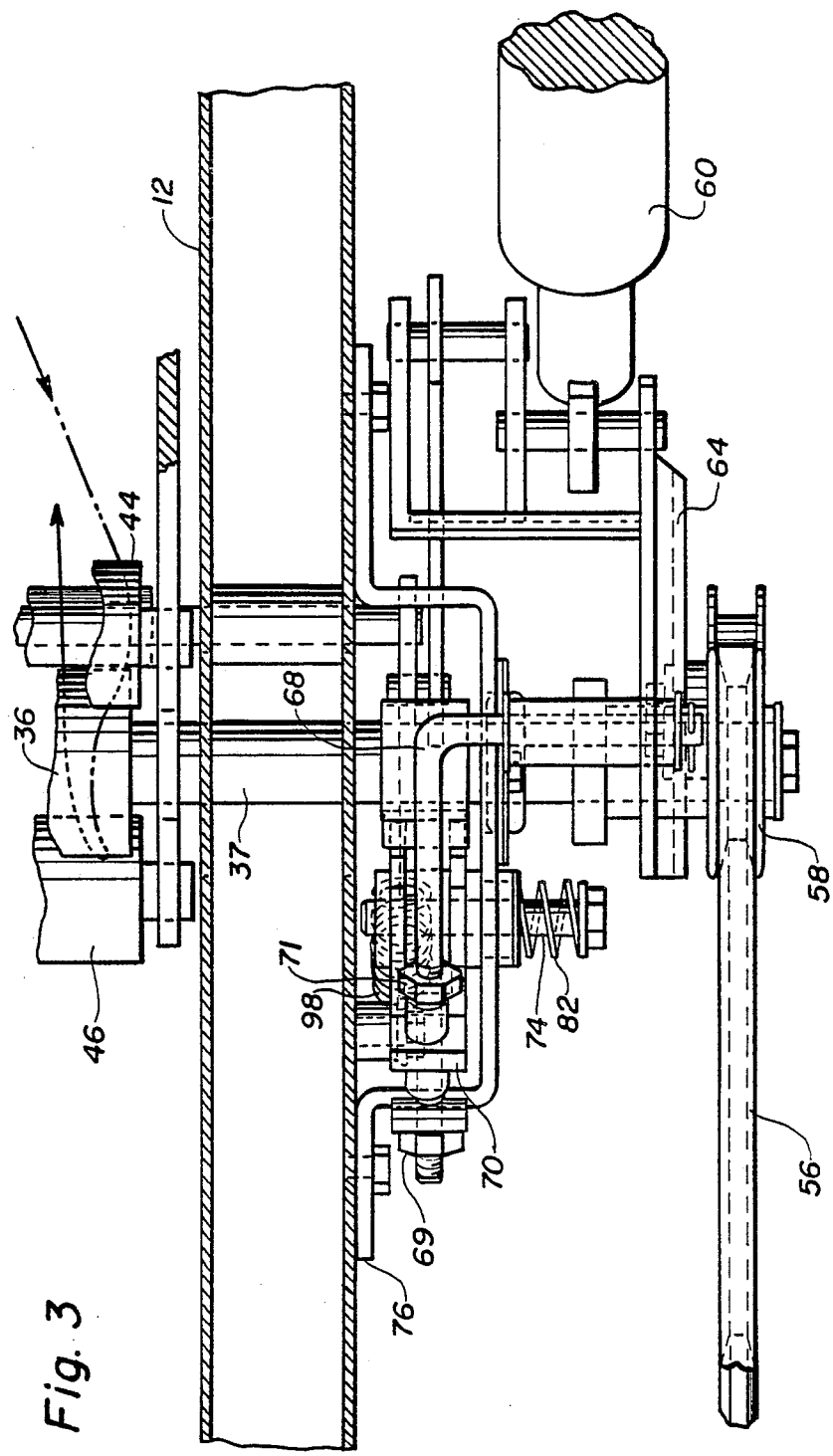
FIG. 3 is a further enlarged sectional view taken along lines 3—3 in FIG. 2.

As seen in FIG. 2, apparatus 32 includes the feed roller 36 and a pair of pinch rollers 44, 46 mounted on opposite sides of the feed roller 36. The netting material N extends from the roll 28 under the pinch roller 44, then upwardly between the pinch roller 44 and the feed roller 36, over the feed roller 36, and then downwardly between the feed roller 36 and the pinch roller 46. A complete description of the manner in which the feed roller 36 and the pinch rollers 44,46 are mounted is disclosed in U.S. Pat. No. 4,790,125 granted Dec. 13, 1988 and incorporated herein by reference. Drive means 34 includes a double sprocket 48 driven by chain 38, another chain 50 connected between double sprocket 48 and a sprocket 52, a pulley 54 fixed to the sprocket 52, and a belt 56 extending around the pulley 54 and another pulley 58 which is mounted on a shaft 37 of the feed roller 36.

An electrical actuator 60 is pivotally connected at one end to a bracket 62 mounted on the main frame 12. The other end of the electrical actuator 60 has a piston 61 pivoted to a lever 64 which is rotatably mounted on the feed roller shaft 37. An idler pulley 66 is carried on the lower end of the lever 64 for engagement with the belt 56. When the lever 64 and the idler pulley 66 are positioned as shown in FIG. 2, the belt 56 is slackened and no driving power is delivered to the feed roller 36. A rod 68 is carried on the upper end of the lever 64 and extends through a plate 70. A latch arm 72 is rotatably mounted on a shaft 74 which is supported by a bracket 76 bolted to the main frame 12. Plate 70 is fixed to the latch arm 72 for rotational movement therewith. Latch arm 72 has a notch 78 engageable with a key 80 on the feed roller 36 for preventing rotation of the feed roller 36. A compression spring 82 on the shaft 74 provides a frictional mounting arrangement for the latch arm 72.

Figure 4:
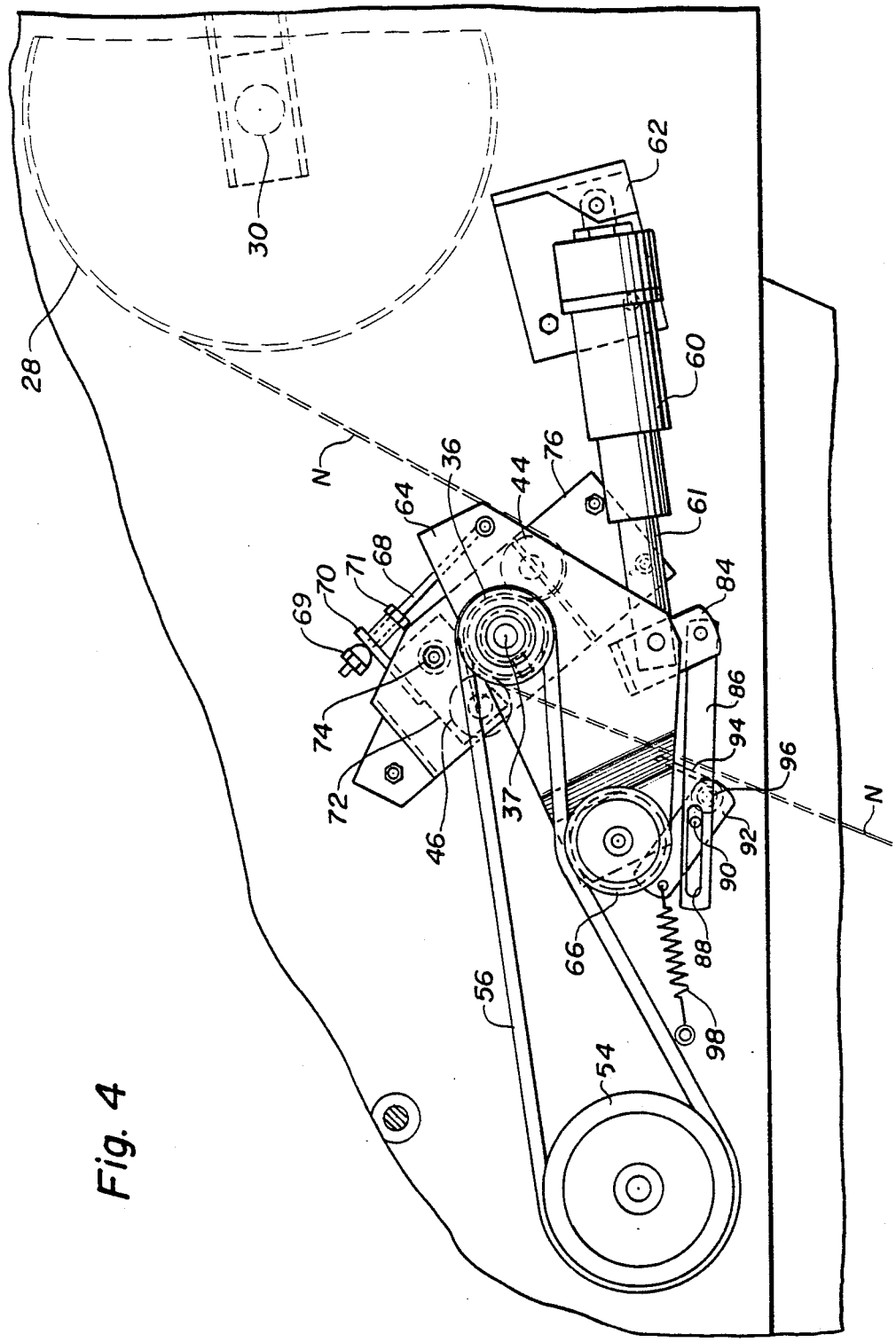
FIG. 4 is an enlarged side elevation view similar to FIG. 2 with the net wrapping apparatus in a feeding position.
Figure 5:
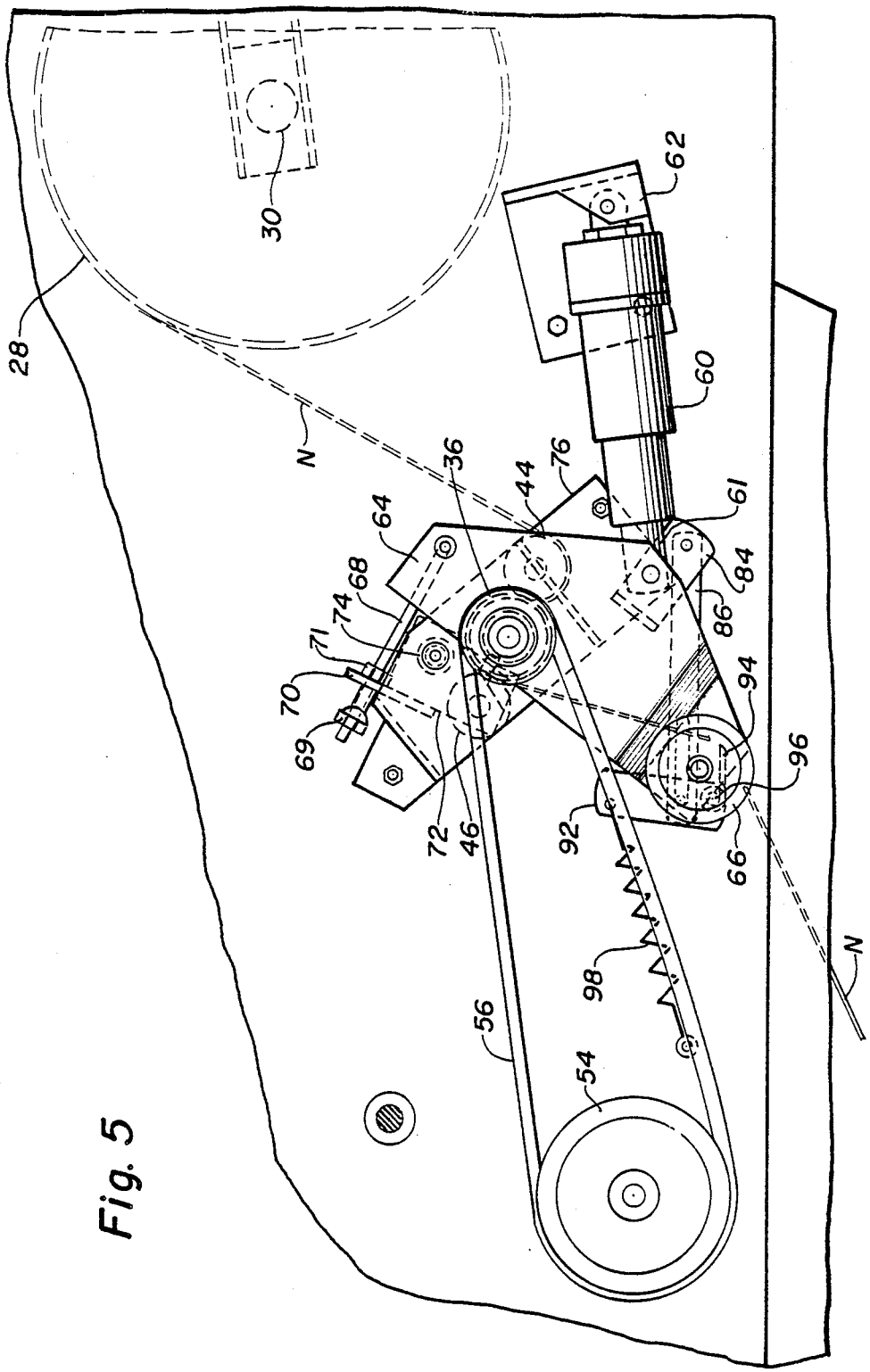
FIG. 5 is an enlarged side elevation view similar to FIG. 2 with the net wrapping apparatus in a cutting position.

Referring to FIGS. 2, 4 and 5, a bracket 84 fixed to the lever 64 is pivotally connected to a link 86 which has a slot 88 engaged with a pin 90 extending from another link 92. A knife 94 is carried by the link 92, and both the knife 94 and link 92 are rotatably mounted on a shaft 96. Knife 94 is movable between a retracted position shown in FIG. 4 and an operative position shown in FIG. 5. A spring 98 connected to link 92 normally urges the knife 94 into the retracted position.

In operation, net wrapping apparatus 32 is in a home or bale forming position illustrated in FIG. 2 during formation of a bale in the round baler 10. With apparatus 32 in this home position, the feed roller 36 is latched by engagement of the notch 78 in the latch arm 72 with the key 80 on the feed roller 36 This latching of the feed roller 36 prevents improper feeding of the netting material N. Also, in the home position of the apparatus 32, the knife 94 is retracted. When a bale has been formed in the round baler 10 and is ready to be wrapped, the electrical actuator 60 is operated to extend the piston 61 thereby rotating the lever 64 in a clockwise direction on the shaft 37 until the apparatus 32 is moved from its home position of FIG. 2 into a feeding position illustrated in FIG. 4.

Initial clockwise rotation of the lever 64 causes rod 68 carried on the upper end thereof to be pulled through plate 70 until a cap nut 69 on the rod 68 engages the plate 70. Further clockwise rotation of lever 64 results in rod 68 rotating the latch arm 72 away from the feed roller 36 so that the notch 78 therein is disengaged from the key 80 on the feed roller 36. The feed roller 36 is unlatched. This further rotation of the lever 64 also moves the idler pulley 66 carried on the lower end thereof into engagement with the belt 56, thereby tightening the belt 56. Driving power is delivered from the pulley 54 to the pulley 58 via the belt 56, and the feed roller 36 is driven to dispense netting material N from the roll 28 into the round baler 10 where it is wrapped circumferentially around a bale. The aforementioned clockwise rotation of the lever 64 does not, however, cause any movement of the knife 94 due to the lost motion connection between the pin 90 on the link 92 and the slot 88 in the link 86.

Once the bale has been wrapped with approximately 1-2 full revolutions of netting material, the electrical actuator 60 is operated to retract the piston 61 and thus rotate the lever 64 in a counterclockwise direction so that the pulley 66 is disengaged from the belt 56. This causes slackening of the belt 56 which stops driving power from being delivered to the pulley 58 connected with the feed roller 36. The initial counterclockwise rotation of the lever 64 also causes the rod 68 to be pulled through plate 70 until nut 71 on the rod 68 engages the plate 70. Further counterclockwise rotation of the lever 64 results in rod 68 rotating latch arm 72 toward the feed roller 36 so that the notch 78 therein is engaged with the key 80 on the feed roller 36. This relatches the feed roller 36. The afore-mentioned counterclockwise rotation of the lever 64 also causes movement of the knife 94 into its operative position to severe the netting material N. The apparatus 32 is now moved to its cutting position shown in FIG. 5. The latching of the feed roller 36 increases the tension on the netting material N so that it is easily cut by the knife 94.

After the netting material has been cut, the electrical actuator 60 is operated again to partially extend the piston 61 causing clockwise rotation of the lever 64 and thereby moving the apparatus 32 from the cutting position of FIG. 5 to the home position of FIG. 2. The feed roller 32 remains latched by the latch arm 72, and the knife 94 is returned to its retracted position. Subsequently, the tailgate 16 is opened and the net wrapped bale is discharged from the round baler 10. The round baler 10 is now ready to form and wrap another bale.

What is claimed is:

1. In a round baler for making cylindrical bales of crop material having apparatus for wrapping said bales with netting material, said apparatus including a knife and a feed roller which may be selectively driven to dispense netting material from a supply roll into said round baler, said apparatus having a home position and a cutting position wherein said feed roller is latched and said knife is actuated, said apparatus also having a feeding position wherein said feed roller is driven, said apparatus comprising:

a lever mounted for rotation about the axis of said feed roller, said lever having first means on one end thereof for effecting the driving of said feed roller and having second means on the other end thereof for effecting the latching of said feed roller.

2. The apparatus of claim 1, wherein said first means comprises an idler pulley engageable with a belt to thereby tighten said belt so that said belt delivers driving power to a pulley connected to said feed roller.

3. The apparatus of claim 1, wherein said second means comprises a rod for rotating a latch arm to latch and unlatch said feed roller.

4. The apparatus of claim 1, further comprising an actuator connected to said lever for moving said apparatus between said home, feeding and cutting positions.

5. The apparatus of claim 1, wherein said knife is connected to said lever.

6. The apparatus of claim 1, further comprising a latch arm which is rotatable for latching and unlatching said feed roller, and wherein said latch arm is rotated to unlatch said feed roller only when said apparatus is moved from said home position to said feeding position.

7. The apparatus of claim 6, wherein said latch arm is rotated to latch said feed roller when said apparatus is moved from said feeding position to said cutting position, and wherein said feed roller remains latched by said latch arm when said apparatus is moved from said cutting position to said home position.

8. The apparatus of claim 7, wherein said knife is connected to said lever, and wherein said knife is retracted when said apparatus is in said home and feeding positions but said knife being actuated when said apparatus is moved from said feeding position to said cutting position.

9. The apparatus of claim 8, further comprising a lost motion connection between said lever and said knife.

10. The apparatus of claim 8, further comprising a spring normally urging said knife into said retracted position.

11. In a round baler for making cylindrical bales of crop material having apparatus for wrapping said bales with netting material, said apparatus including a knife and a feed roller which may be selectively driven to dispense netting material from a supply roll into said round baler, said apparatus having a home position wherein said feed roller is latched and said knife is retracted and a cutting position wherein said feed roller is latched and said knife is actuated, said apparatus also having a feeding position wherein said feed roller is driven, said apparatus comprising:

a lever mounted for rotation about the axis of said feed roller;

said lever having an idler pulley on one end thereof engageable with a belt to thereby tighten said belt so that said belt delivers driving power to a pulley connected to said feed roller;

said lever also having a rod on the other end thereof for rotating a latch arm to latch and unlatch said feed roller;

an actuator connected to said lever for moving said apparatus between said home, feeding and cutting positions;

said knife being connected to said lever;

said latch arm being rotated to unlatch said feed roller only when said apparatus is moved from said home position to said feeding position;

said latch arm being rotated to latch said feed roller when said apparatus is moved from said feeding position to said cutting position;

said feed roller remaining latched by said latch arm when said apparatus is moved from said cutting position to said home position; and said knife being retracted when said apparatus is in said home and feeding positions but said knife being moved actuated when said apparatus is moved from said feeding position to said cutting position.

* * * * *